United States  [11] 3,580,675

[72] Inventors Fritz Hieber
 Grunwald, Munich;
 Erich Burger, Unterhaching; Hans-Peter
 Huber, Munich, all of, Germany
[21] Appl. No. 778,854
[22] Filed Nov. 25, 1968
[45] Patented May 25, 1971
[73] Assignee Agfa-Gevaert Aktiengesellschaft
 Leverkusen, Germany
[32] Priority Nov. 27, 1967
[33] Germany
[31] A57,493

[54] STRIP SCANNING COPYING APPARATUS
 18 Claims, 7 Drawing Figs.
[52] U.S. Cl. .................................................. 355/50,
 350/213, 355/51, 355/66
[51] Int. Cl. ............................................... G03b 27/50
[50] Field of Search ........................................ 355/50, 51,
 66; 350/213

[56] References Cited
UNITED STATES PATENTS
3,241,438  3/1966  Frank ........................... 355/50
3,451,752  6/1969  Frank ........................... 355/66X Primary Examiner—Samuel S. Matthews
Assistant Examiner—Richard A. Wintercorn
Attorney—Michael S. Striker ABSTRACT: Strip portions of an original are successively scanned by a row of lenses with toric refractive surfaces having a first radius of curvature in the scanning direction and a second smaller radius of curvature in a transverse direction. The first and second radii are selected so that the image of a part of the scanned strip-shaped portion projected by each lens is reversed in the scanning direction only, and not reversed in the transverse direction of the row of lens means the exposed strip-shaped portions of the copy sheet form together a continuous complete legible image of the original.

PATENTED MAY 25 1971

INVENTORS
FRITZ HIEBER
ERICH BURGER
HANS-PETER HUBER

BY Michael S. Striker

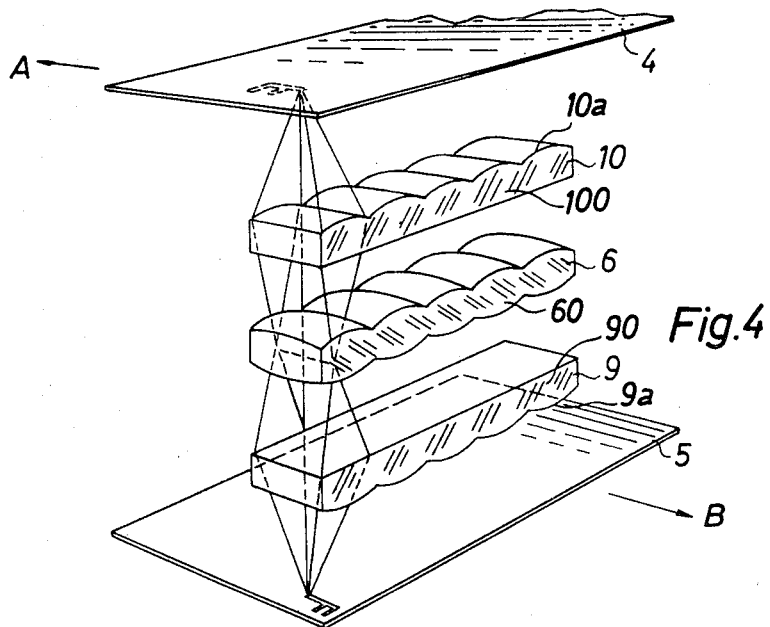
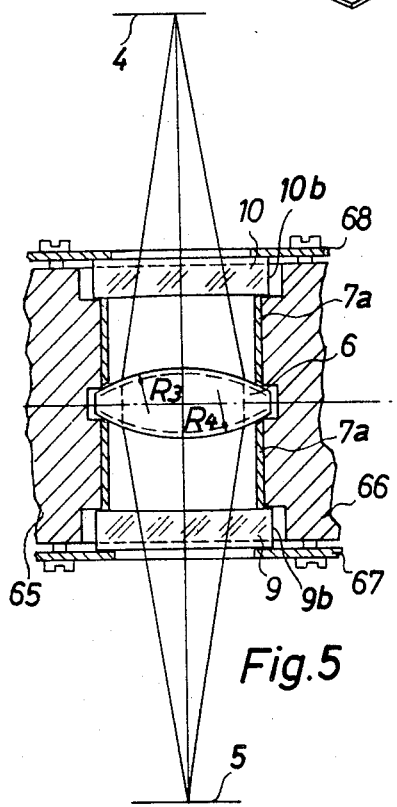
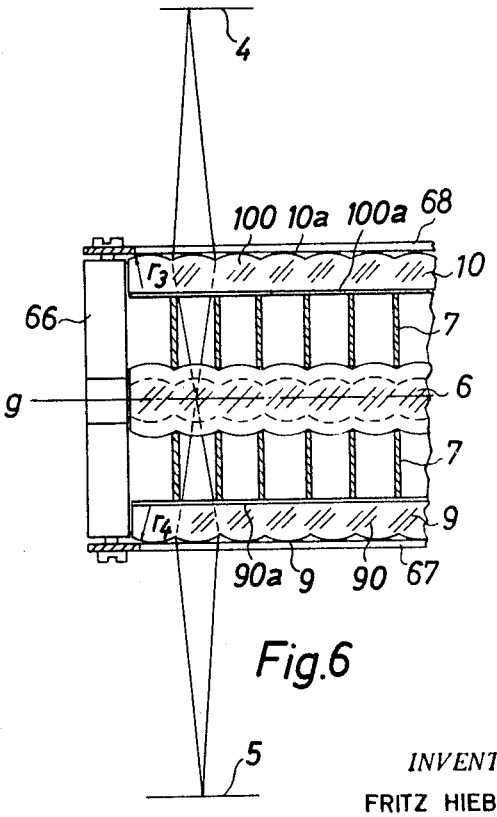
INVENTORS
FRITZ HIEBER
ERICH BURGER
HANS-PETER HUBER 3,580,675

1

STRIP SCANNING COPYING APPARATUS

BACKGROUND OF THE INVENTION

Copying apparatus is known in which a narrow optical system is moved relative to an original and a copy sheet for projecting successive scanned strip-shaped portions of the original onto successive strip-shaped portion of the copy sheet to form on the same a complete reversed image of the original. In copying apparatus of this type, the image on the copy sheet has to be transferred to another copy sheet to obtain a legible copy. When the final copy is to be directly made on light sensitive material, it is necessary to use in the optical system an odd number of intermediate mirror reflecting surfaces. However, mirrors require space which compensate any reduction of the size of the apparatus obtained by strip scanning.

SUMMARY OF THE INVENTION

It is one object of the present invention to provide a strip scanning copying apparatus which produces without intermediate mirrors a nonreversed legible copy.

Another object of the invention is to provide a strip scanning apparatus which produces a legible first copy of the original.

Another object of the invention is to reverse each scanned portion of the original only in the scanning direction, and to cause no reversal of the image in a direction transverse to the scanning direction.

With these objects in view, the present invention provides lens means which form an intermediate image only in a direction transverse to the scanning direction.

Due to this manner of forming the image on the copy sheet, the advantage of the overlapping of the image portion produced by individual lens means of a row is maintained, although due to the direct forming of the image on the copy sheet in the scanning direction, a directly legible image is obtained on the copy sheet after dyeing.

A copying apparatus according to one embodiment of the invention comprises a supporting arrangement including first supporting means for supporting an original or master, second supporting means for supporting a radiation sensitive copy sheet in a position confronting the original, and third supporting means disposed between the first and second supporting means and supporting an optical system.

The first, second and third supporting means are movable relative to each other in a scanning direction. For example, the supporting means for the original may be a casing with a transparent wall on which the original is placed face down, the second supporting means preferably include transporting rollers for supporting the copy sheet in a position confronting the original with its light sensitive surface, and the third supporting means is preferably a carriage mounted for movement in the scanning direction on guide means of the casing. The optical system is narrow in the scanning direction so that successive strip portions of the original extending in a direction transverse to the scanning direction are scanned and projected as strip-shaped images onto corresponding successive strip portions of the copy sheet.

The optical system includes a transverse row of lens means each of which has at least two cooperating refractive surfaces. Each of the refractive surfaces has a first radius of curvature in the scanning direction and a second smaller radius of curvature in the transverse direction. The first and second radii of curvature are selected so that the image of a part of the scanned strip-shaped portion projected by each lens means, is reversed in the scanning direction and not reversed in the transverse direction whereby a continuous nonreversed complete image of the original is produced on the copy sheet.

In one embodiment of the invention, each lens means is a single lens having two toric refractive surfaces on opposite ends, and two pairs of planar parallel lateral faces, so that each lens has a rectangular cross section. The flat lenses can be easily mounted on a supporting beam-shaped frame, preferably supporting shielding plates between adjacent lateral faces of the lenses.

2

In another embodiment of the invention, each lens means of the row of lens means includes two outer lens elements having cylindrical refractive surfaces, and an image forming central lens between the same. The radius of curvature of the cylindrical refractive surfaces is infinite in the scanning direction, and the radius of curvature in the transverse direction is selected to form an intermediate image in the plane of the image forming central lens.

The two rows of outer lenses, and the row of central lenses are preferably constructed as lenticular bars consisting of a synthetic plastic transparent material. The cylindrical refractive surfaces of the outer lenses face outward, and the outer lenticular bars have planar inner faces confronting the central lenticular bar.

In the preferred embodiment of the invention, a carriage supporting the optical system is moved on guide means of a casing in the scanning direction relative to an original supported on the transparent top wall of the casing. The carriage supports a supply reel for a band-shaped copy sheet which is fed by transporting rollers past the optical system, and then reversed and deposited on a conveyor. When the carriage with the optical system and the band-shaped copy sheet arrives in end position, the copy sheet is cut off, and the cutoff portion of the copy sheet, carrying the complete image of the original, is transported by the conveyor to a developing station in the casing from where it is delivered by another conveyor to the outlet of the casing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a fragmentary perspective view schematically illustrating a strip scanning optical system according to another embodiment of the invention;

FIG. 5 is a cross-sectional view of the embodiment of FIG. 4 taken along a plane extending in the scanning direction;

FIG. 6 is a sectional view of the optical system of the embodiment of FIG. 4 taken in a plane transverse to the scanning direction.

DESCRIPTION OF THE PREFERRED EMBODIMENTS

Figure 1:
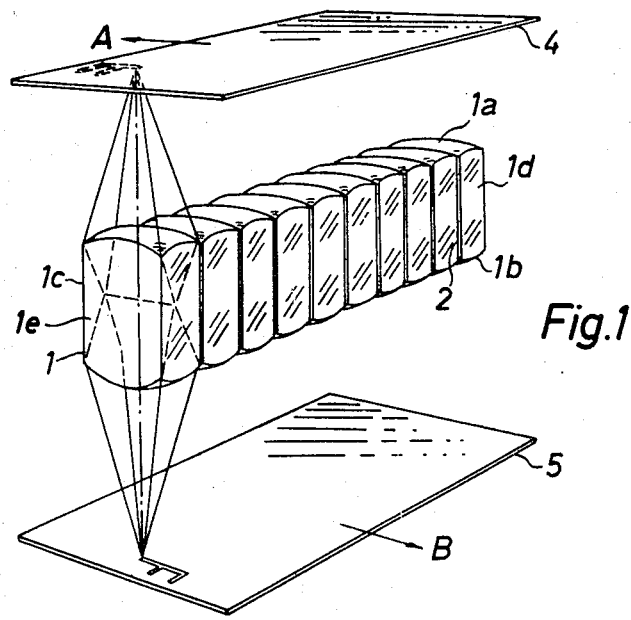
FIG. 1 is a fragmentary perspective view schematically illustrating the strip scanning optical system according to one embodiment of the invention.
Figure 2:
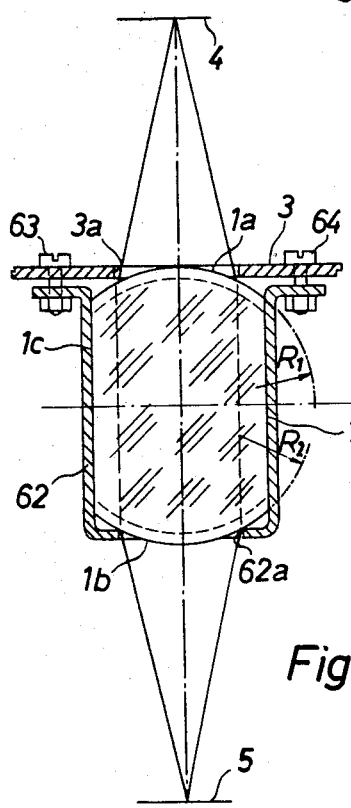
FIG. 2 is a cross-sectional view of the embodiment of FIG. 1 taken in a plane extending in the scanning direction.
Figure 3:
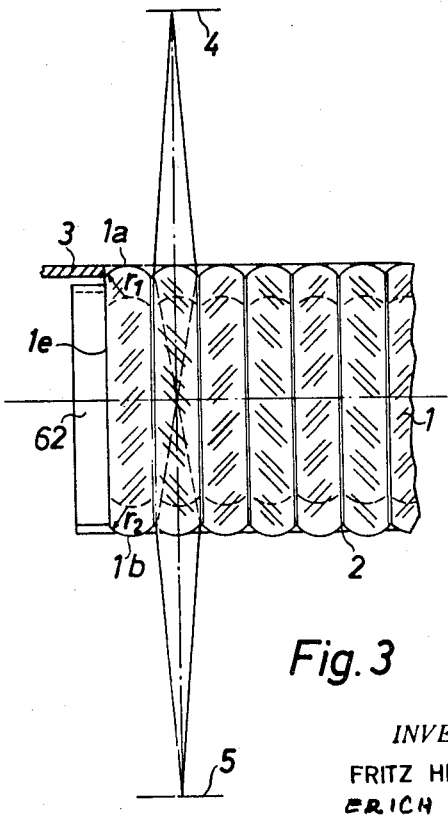
FIG. 3 is a sectional view of the embodiment of FIG. 1 taken in the direction transverse to the scanning direction.

Referring first to FIGS. 1 to 3, an optical system consists of a row of lenses 1, each of which has toric refractive surfaces 1a and 1b at the ends thereof. Each lens has a first pair of planar lateral faces 1c and 1d, and a second pair of lateral faces 1e. Adjacent lenses 1 are separated by light impermeable shielding layers 2 consisting of lacquer.

The row of lenses 1 is supported in a U-shaped frame having an aperture 62a, and being secured by screws 63 and 64 to a supporting means 3 which also has aperture 3a which forms a rectangular diaphragm.

The toric refractive surfaces 1a and 1b have in a plane extending in the scanning direction, radii of curvature $R_1$ and $R_2$, respectively. In a plane transverse to the scanning direction, the toric refractive surfaces 1a and 1b have radii of curvature $r_1$ and $r_2$.

The row of flat lenses 1 extends transverse to the scanning direction which is represented by arrows A and B which indicate in FIG. 1 the direction of movement of an original or master 4, and an opposite direction of movement of a light sensitive copy sheet 5. A relative motion between the optical system formed by lenses 1 and the original and copy sheet is necessary, but it is possible to hold the original 4 or the copy sheet 5 stationary, and to move the row of lenses 1 in the scanning direction relative to the original and copy sheet. In the copying apparatus illustrated in FIG. 7, the original, shown to be a book 33, rests face down on a transparent plate 51 b of a casing 12. The row of lenses 1 scans the original 33 in the direction of the arrow C, and a copy sheet 22 moves in the direction D relative to the row of lenses 1 and to the original 33.

Referring again to FIGS. 1 to 3, radii $R_1$ and $R_2$ are selected so that a reversed image of the respective portion of the original 4 is projected onto the copy sheet 5. All lenses 1 of the row project a strip-shaped reverse image of a strip-shaped portion of original A onto a stripshaped portion of copy sheet 5. Each point of original 4 is directly imaged in the scanning direction as shown in FIG. 2.

In a direction transverse to the scanning direction, which is the direction of the row of lenses 1, the radii $r_1$ and $r_2$ are selected so that an intermediate image is in the intermediate image plane $g$ of the respective scanned portion of the original 4, and so that a nonreversed image is projected on the copy sheet 5, as shown in FIG. 3.

The radii $R_1$ and $R_2$ are selected so that the standard equation $$\frac{1}{a}+\frac{1}{g}=\frac{1}{f}$$

defining the distances of the optical system from the original and from the copy sheet is satisfied.

The same equation must be satisfied by the focal length associated with the radii $r_1$ and $r_2$ regarding the distances of the refractive surfaces from the original 4 and the intermediate image plane $g$, and from the copy sheet 5 and the intermediate image plane $g$, respectively.

In a practical construction of the embodiment of FIG. 1, the distance between the original 4 and copy sheet 5 is 160 mm., radii $R_1$ and $R_2$ are each 24 mm., and the radii $r_1$ and $r_2$ are each 6.2 mm. The thickness of each lens is 48 mm., so that the centers of curvature of radii $R_1$ and $R_2$ coincide, and the refractive surfaces $1a$ and $1b$ are located on an imaginary circular line and can be easily polished.

The planar faces $1c$, $1d$, and $1e$ can be made after the finishing of the refractive surfaces $1a$ and $1d$ can be omitted if a tubular supporting frame for the row of lenses 1 is used and provided with a rectangular aperture for each lens 1. Within the supporting frame 62, 63, the lenses 1 may be held in abutting position by a spring, not shown, optically separated from each other by shielding plates or layers 2.

A precise overlapping of the individual images produced by each lens 1 will occur when the abutting planar faces $1e$ are parallel to plane passing through the centers of curvature associated with the radii $r_1$ and $r_2$. The spacing between adjacent lenses 1, and the thickness of the light absorbing shielding layers 2 have no bearing on the production of a continuous image by the row of lenses 1.

Due to the fact that greater radii $R_1$ and $R_2$ are selected so that the refractive surfaces $1a$, $1b$ do not form an intermediate image in the intermediate image plane $g$, the image formed on the copy sheet 5 is reversed in the scanning direction. For example, the letter F appearing on the bottom face of the original 4 is reversed and imaged turned an angle of 180° on the copy sheet, as is apparent from the positions of the transverse bars of the letter F of FIG. 1.

However, transverse to the scanning direction, the refractive surfaces $1a$ and $1b$ form an intermediate image so that the image formed on the copy sheet 5 is not reversed in this transverse direction. As shown in FIG. 1, the transverse bars of the letter F point in the same direction. When the original 4 is viewed from below, and the copy sheet is viewed from above, the letter F is legible. A mirror reversing of the image of the original 4 takes place so that in the illustrated arrangement in which the original and the copy are legible when viewed from a position between the original and the copy sheet, a legible copy is made on a nontransparent copy sheet which can be dyed without transfer to another copy sheet and without use of additional reversing mirror. An optical system as described is particularly necessary for the making of copies on a ZnO copy sheet in which the final print is obtained by dying the exposed copy sheet.

Due to the forming of an intermediate image in the image plane $g$ in a direction transverse to the scanning direction, an overlapping of the image portion produced by the respective lenses 1 takes place, if the intermediate image is reduced as compared with the scanned image on the original 4, and the projected image on the copy sheet 5. The overlapping of the image portions increases the light intensity of the optical system. In the above-described practical construction, each image element covers in a direction transverse to the scanning direction, 3.5 flat lenses 1. The entering of light rays into adjacent lenses, which would disturb the overlapping of the images, is prevented by the shielding layers or plates 2.

From the above description of FIGS. 1 to 3, it will be apparent that the optical system of the invention comprises an optical scanning system formed of a row of lens elements, shown to be flat single lenses 1, each of which has two refractive surfaces $1a$ and $1b$.

In the embodiment of FIGS. 4 to 5, the general arrangement shown in FIG. 4 is the same as described with reference to FIG. 1, but the optical system is composed of a row of lens means, each of which includes two outer lenses 9 and 10, and a central lens 6. Each outer lens 9 has a cylindrical refractive surface $9a$, and each outer lens 10 has a cylindrical refractive surface $10a$. The central lens 6 of each lens means 9, 6, 10 has opposite refractive surfaces having the radii of curvature $R_3$ and $R_4$ which may be equal.

As shown in FIGS. 4 to 6, the outer lenses 9 are combined in a lenticular bar 90, the outer lenses 10 are combined in a lenticular bar 100, and the central lenses 6 are combined in a lenticular bar 60.

As best seen in FIG. 5, radii of curvature of refractive surfaces $9a$ and $10a$ are infinite in a plane in the scanning direction, and a reversed image of a portion of the original 4 is produced on the copy sheet 5. However, in a plane extending transverse to the scanning direction, the radii $r_3$ and $r_4$ are effective to form an intermediate reduced image in the image plane $g$ so that a nonreversed image of a portion of original 4 is formed on copy sheet 5.

Lens bars 100, 60 and 90 may be integral and consist of a synthetic plastic material, or a number of outer lenses 10 may be adhesively secured to each other. The inner faces $100a$ and $90a$ of the lenticular bars 10 and 9, and the lateral faces $9b$ and $10b$ of the same are planar.

The radii $R_3$ and $R_4$ of the central lenses 6 forming the lenticular bar 60 are selected so that the original 4 is imaged on the copy sheet 5. The refractive surfaces $9a$ and $10a$ only serve the purpose of effecting reversing of the projected image in the scanning direction, and no reversing in the direction transversed to the same. The focal length of the cylindrical outer lenses is determined in accordance with the above equation so that the distances from the refractive surfaces $9a$ and $10a$ to the intermediate image plane $g$, and to the original 4 and the copy sheet 5, respectively, satisfy the equation.

The image forming central lenses 6 have the effect of field lenses for the image formed in the transverse direction. While in the optical system of the invention, the cylinder lenses 9 and 10 are not imaged in each other, which would be the optimal effect of a field lens, the rays coming from one of the cylinder lenses 10 are deflected in a direction toward the other cylinder lens 9 so that a noticeable gain of light intensity is obtained.

A shielding plate 7 provided in the spaces between the outer lenticular bars 90 and 100, and the central lenticular bar 60 in planes between lens means 9, 6, 10 so that rays passing through associated lenses 6, 9 and 10 of a lens means cannot enter the path of the rays of an adjacent lens means 6, 9, 10. The shielding plates 7 are connected by lateral walls 7a so that the shielding means resemble the upper and lower rectangular honeycombs.

Two lateral bars 65 and 66 of a transverse supporting frame have recesses in which the lenticular bars 90, 60 and 100 are supported, as best seen in FIG. 5.

When original 4 is moved in the direction A, and copy sheet 5 is moved in the direction B, successive strip-shaped portions of the original 4 are scanned by the optical system 9, 6, 10 and projected on corresponding successive strip-shaped portions of the copy sheet 6 so that on the same a complete legible image of the original is formed. The image on the copy sheet is reversed in the scanning direction, and not reversed in the direction transverse to the same, which is necessitated by the fact that the original 4 is placed face down opposite the optical system 9, 6, 10.

Figure 7:
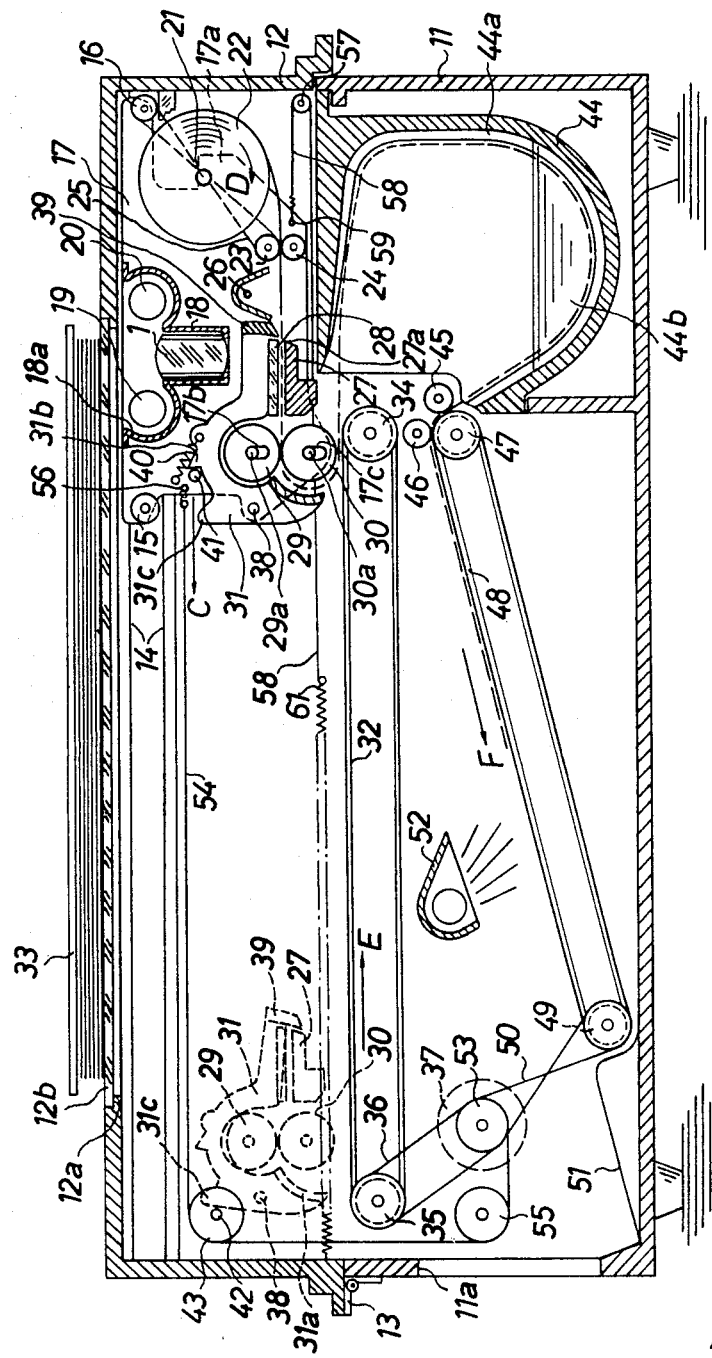
FIG. 7 is a sectional view illustrating a copying apparatus embodying the optical system according to the invention.

Referring now to FIG. 7, a strip scanning copying apparatus according to the invention has a casing with a lower part 11, and a closure part 12 connected by a hinge 13 to the lower part 11. The top wall of the closure part 12 has a rectangular opening bounded by a shoulder 12a on which a transparent top plate 12b rests. The page to be copied of a book 33 is placed face down on the transparent plate 12b. Guide rail means 14 are secured within closure part 12 extending in longitudinal direction of the same, and support a carriage 17 whose supporting rollers 15 and 16 roll on the guide rail means 14 when carriage 17 is moved to the left out of the illustrated initial position to an end position located at the left end of the closure part 12, as viewed in FIG. 7. An optical system according to the invention is mounted on a frame beam 18 which extends between the front wall and the rear wall of carriage 17, and supports a row of lenses 1, substantially as described with reference to FIGS. 2 and 3. However, the two lateral bars which form the frame 18 are continued in two curved reflector portions 18a in the centers of which two elongated lamps 19 and 20 are detachably mounted. Lamps 19 and 20 extend parallel to the row of lenses 1 transverse to the scanning direction C of the carriage for illuminating a strip portion of the original page lying on the transparent plate 12b. During movement of carriage 17, successive strip portions of the original are illuminated, and scanned by the row of lenses 1.

A reel 17a is mounted between the walls of the carriage 17 on a shaft 21 for free turning movement, and supports a wound-up package of a band-shaped copy sheet 22 which is guided between a pair of transporting rollers 23, 24 of which roller 23 is driven over an overrunning clutch, not shown, by an endless elastic belt 25 from a drive roller 16. Transporting rollers 23 and 24 move the band-shaped copy sheet 22 in the direction of the arrow D under a corona discharge device 26. The copy sheet is preferably a ZnO paper which is charged by the charging device 26. The transported copy sheet 22 passes over a supporting member 27 and under a transparent plate 28 located under the optical system 1, 18 so that the strip-shaped images are successively formed on the copy sheet 22 which moves relative to the carriage 17 and the optical system carried by the same. In the illustrated embodiment, the speed at which copy sheet 22 moves in the direction of arrow C is twice the speed in which the optical system 1, 18 moves relative to the original 33 in the same direction. Directly after the copy sheet 22 has passed the optical system, it is guided between a pair of reversing rollers 29 and 30 and guided in an arc of 180° about reversing roller 30 to move in a direction opposite the direction of arrow C. Since the speed of the reversed copy sheet is equal to the opposite speed of carriage 17 in the direction of the arrow C, the reversed copy sheet 26 moves at the same speed as carriage 17 in the direction of the arrow C, and there is no relative movement between the reversed portion of the copy sheet and the carriage.

The journals 29a and 30a of reversing rollers 29, 30 are respectively mounted in vertical slots 17b and 17c in the end wall of the carriage 17 so that roller 29 rests on the copy sheet and roller 30, and roller 30 rests on the reversed copy sheet and on a conveyor 32 which passes over two rollers 34 and 35. Conveyor 32 is formed by several endless loops guided in annular grooves of rollers 33 and 34. Roller 35 is driven by an elastic endless belt 36 from a drive motor 37 in the direction of the arrow E which is opposite to the direction of the arrow C, and to the direction of the reversed band-shaped copy sheet 22. The upper run of conveyor 32 engages the reversed copy sheet 22 and urges the same to move in the direction of the arrow E. Since there is no relative movement in the reversed portion of the copy sheet 22 and the carriage 17 during movement of the same in the direction of the arrow C, the reversed portion of copy sheet 22 is placed on the upper run of conveyor 32 during movement of the carriage 17 from the initial position of rest to the end position.

A shaft 38 between the end wall of carriage 17 supports a member 31 for angular movement. Member 31 has a cutting portion 39 whose edge extends transverse to the scanning direction across the band-shaped copy sheet at a point located at the inlet of the guideway formed by members 27 and 28 for the copy sheet 22. Cutting member 39 is held in the illustrated inoperative position by a spring 40 so that the copy sheet can be transported by transporting rollers 23, 24 during movement of carriage 17. Member 31 abuts a stop 41 on carriage 17 in the illustrated inoperative position, but when carriage 17 reaches its end position, an actuator portion 31c of member 31 abuts an actuator member 42 mounted on the closure part 12 of the casing so that member 31 is tilted to the cutting position shown in broken lines in which cutting member 39 cuts off the leading exposed portion of copy sheet 22, while the unexposed portion is held by the transporting rollers 23, 24.

Member 31 has an arcuate guide portion 31a located opposite the peripheral portion of reversing roller 30 in the inoperative position of member 31 so that the copy sheet is reliably guided to the reversed position during the movement of the carriage. In the cutting position of member 31, guide portion 31a moves away from reversing roller 30.

The cut off exposed portion of the copy sheet, which carries a complete image of the original 33 is no longer connected with the transporting rollers 23 and 24, and is transported by conveyor 32 in the direction of the arrow E while the carriage 17 starts its return movement from the end position to the initial position of rest in the same direction indicated by the arrow E. The cut off copy sheet portion is transported by the conveyor 32 into a cavity of developing means 44, and is guided by ridges 44a to move along the inner surface of the same through a developing liquid 44b until it is gripped by rollers 45, 46 and a conveyor band 48 passing over rollers 47 and 49. Drive roller 49 of conveyor 48 is driven by an elastic endless belt 50 from motor 37. Conveyor 48 moves in the direction of the arrow F and transports the exposed and developed copy sheet portion carrying the image of the original to a receiving surface 51 from where it can be removed through an opening 11 by the operator. While travelling on conveyor 48, the copy sheet is dried by an infrared radiator 52 extending between the wall of casing portion 11a across the transported copy sheet. Conveyor 48 preferably consists of a plurality of endless ropes.

A winding drum 53 is connected by a releasable coupling, not shown, with drive motor 37 and has a rope 54 wound up thereon. Rope 54 is guided over guide rollers 55 and 43 and hooked into pin 56 of carriage 17. Another rope 58 is secured to a pin 59 of carriage 17, guided over guide roller 57 on the same, and connected to a return spring 61 whose other end is secured to closure part 12 so that spring 61 is tensioned during movement of the carriage 17 from the position of rest to the end position, and urges carriage 17 to return to the initial position.

In the initial position of rest of all parts, the cut off leading end of the band-shaped copy sheet 22 is located exactly under the end of transparent plate 12b. Illuminating lamps 19 and 20, and the corona discharge device 26 are connected to a voltage source. By a manual operation the coupling between the winding drum 53 and the drive motor 37 is closed, and rope 54 is wound up on winding drum 53 so that carriage 17 starts its movement out of the illustrated position of rest in the direction of the arrow C.

A pulley connected with winding drum 53 drives through belts 36 and 50, conveyors 48 and 32. When carriage 17 starts its movement, roller 16 rolls on guide means 14 and transmits rotary motion through the endless belt 21 and a pair of pulleys, not shown, to transporting roller 23 so that copy sheet 22 is transported in the direction of the arrow D and wound off supply reel 17a which moves with the carriage so that copy sheet 22 is transported by transporting rollers 23, 24 under the transparent plate 28 and the row of lens means 1. Supply reel 17a is preferably provided with a conventional brake.

The leading portion of the transported copy sheet 22 passes the corona discharge device 26 and is charged so that the latent image is formed on the ZnO paper on successive strip portions onto which a strip-shaped image of the strip-shaped scanned portion of original 33 is projected.

The band-shaped copy sheet 22 which is fed out of the guideway between members 27, 28 at a speed relative to carriage 17 which is equal to the speed of carriage 17, is reversed by reversing roller 29 so that the reversed portion of the copy sheet has no speed relative to carriage 17 and is deposited on the upper run of conveyor 32 while carriage 17 moves to the end position to which it is pulled by rope 54 being wound up on winding drum 53.

The reversing rollers 29, 30 are pressed by their own weight against the copy sheet while the same is being placed on conveyor 32. The friction between the upper run of conveyor 32 and the copy sheet portion thereon urges the copy sheet to move in the direction of the arrow E, but as long as the copy sheet is held between rollers 29, 30 and 23, 24 and connected to the package on supply reel 17a, it cannot be transported by the conveyor 32.

When the carriage arrives at the end position indicated in broken lines, the actuator member 42 engages the actuator portion 31c of member 31 and turns the same to the cutting position so that the copy sheet is cut off at the entry of guideway between parts 27 and 28 by cutting member 39. As soon as the leading and exposed portion of the copy sheet is cut off, conveyor 32 is effective to transport the same in the direction of the arrow E into the cavity of the developing means 44 so that the cut off copy sheet portion is developed and then transported by conveyor 48 to the proximity of the opening 11a, while being dried by infrared heater 52. Copy sheets accumulated at the supporting face 51 can be removed by the operator through opening 11a.

The coupling between drive motor 37 and winding drum 53 is now manually released so that the winding drum 53 is freely turnable, and does not resist the pull of return spring 61 which pulls carriage 17 from the end position in the direction of the arrow E to the position of rest while a portion of rope 54 is unwound from winding drum 53. Due to the fact that an overrunning clutch is provided between transporting roller 23 and the drive roller 16, the reverse rotation of drive roller 16 running on guide rail means 14 does not cause reverse transport of copy sheet 22 by transporting rollers 23, 24, and the leading end of the band-shaped copy sheet remains under the corona discharge device 26, while the cut off end is located precisely under the edge of shoulder 12a so that a transverse strip-shaped portion at the beginning of the original 33 can be scanned by the row of lens means 1. It will be understood that instead of the lens means 1 described with reference to FIGS. 1 to 3, lens means 9, 6, 10 described with reference to FIGS. 5 and 6 can be used.

While the exposed cut off copy sheet portion is still running through the developing means 44 at a speed determined by conveyor 32 driven by drive motor 37 through a pulley and belt 36, the next following copying operation can again be started so that the reversed band-shaped copy sheet 22 is deposited on the cut off copy sheet portion still transported by conveyor 32 toward the developing means 44. However, it is necessary that the endless loops of conveyor 32 consists of a material which has a greater friction coefficient when acting on the copy sheet paper of the cut off copy sheet portion, than the friction coefficient between the cut off copy sheet portion and the deposited copy sheet. If the transporting force exerted by conveyor 22 in the direction of the arrow E on the cut off copy sheet portion is greater than the force applied by the latter to the deposited band-shaped copy sheet portion, the cut off copy sheet portion of the conveyor 32 is transported into the developing means 44 while the reversed band-shaped copy sheet portion is gradually deposited on the cut off copy sheet portion and on the free conveyor portion following the cut off sheet portion. Consequently, successive copying operations can overlap during developing of a first copy sheet portion and exposure of the following copy sheet portion.

It will be understood that each of the elements described above, or two or more together, may also find a useful application in other types of copying apparatus differing from the types described above.

While the invention has been illustrated and described as embodied in a strip scanning copying apparatus having a row of lenses, each of which is provided with toric cylindrical refractive surfaces for producing the reversed image in the scanning direction and a nonreversed image in the direction of the row of lenses, it is not intended to be limited to the details shown, since various modifications and structural changes may be made without departing in any way from the spirit of the present invention.

What is claimed as new and desired to be protected by Letters Patent is set forth in the appended claims.

We claim:

1. Strip scanning copying apparatus comprising a supporting arrangement including first supporting means for supporting an original, second supporting means for supporting a radiation sensitive copy sheet in a position confronting said original, and third supporting means disposed between said first and second supporting means, said first, second, and third supporting means being movable relative to each other in a scanning direction; an optical system mounted on said third supporting means for scanning during relative movement of said supporting means in said scanning direction successive strip portions of said original extending in a direction transverse to said scanning direction and for projecting strip-shaped images of scanned strip portions onto corresponding successive strip portions of said copy sheet so as to form thereon a complete image of the original, said optical system including a row of lens means extending in said transverse direction, each lens means having at least two cooperating toric refractive surfaces, each said refractive surface having a first radius of curvature in said scanning direction and a second radius of curvature in said transverse direction, said first radii being greater than said second radii and selected to form no intermediate image, and said second radii being selected so that each lens means forms an intermediate image whereby the image on a part of said scanned stripshaped portion projected by each lens means is reversed in said scanning direction and not reversed in said transverse direction, and a continuous nonreversed complete image of said original is produced on said copy sheet.

2. Apparatus as claimed in claim 1 wherein said two refractive surfaces of each lens means have in said scanning direction a common center of curvature spaced from said two refractive surfaces a distance equal to said first radius.

3. Apparatus as claimed in claim 1 wherein each lens means is a single lens having said two refractive surfaces respectively confronting said original and said copy sheet, said refractive surfaces being toric, and said first radii being greater than said second radii, wherein said second radii are selected to form an intermediate image; and wherein said optical system includes a supporting frame mounted on said third supporting means for supporting said lenses in a row.

4. Apparatus as claimed in claim 3 and including shielding means located between adjacent lenses of said row, said shielding means being impermeable to light and supported on said supporting frame.

5. Apparatus as claimed in claim 4 wherein each said lens has a rectangular cross section and is laterally bounded by two pairs of opposite parallel planar faces at the ends of which said refractive surfaces are located; wherein said shielding means include shielding plates between adjacent planar faces of adjacent lenses of said row; and wherein said supporting frame includes means for forming a rectangular aperture adjacent at least one of said toric refractive surfaces.

6. Apparatus as claimed in claim 1 wherein each said lens means includes two lens elements having said refractive surfaces, and an image forming central lens between the same; and wherein said first radius of curvature of each refractive surface is infinite and said second radius of curvature of each refractive surface is selected so that an intermediate image is formed in the plane of said central lens.

7. Apparatus as claimed in claim 6 wherein each said lens element has said refractive cylindrical surface on the outer side thereof remote from said central lens, and has on the inner side thereof a planar face confronting said central lens.

8. Apparatus as claimed in claim 6 wherein said lens elements and said central lenses are disposed in three spaced rows and form two outer integral lenticular bars and a central integral lenticular bar.

9. Apparatus as claimed in claim 8 and including a supporting frame mounted on said third supporting means for supporting said lenticular bars; and shielding means impermeable to light and disposed between said lenticular bars in planes extending between adjacent lens means.

10. Apparatus as claimed in claim 8 wherein said outer lenticular bars have planar inner faces confronting said central lenticular bar, and planar lateral faces between said planar inner faces and the outer refractive surfaces of said outer lenticular bars.

11. Strip scanning copying apparatus comprising a supporting arrangement including stationary first supporting means for supporting an original, second supporting means for supporting a radiation sensitive copy sheet in a position confronting said original and third supporting means including a carriage mounted for movement in said scanning direction along said first supporting means between a position of rest and an end position; said second supporting means including a supply reel for a band-shaped copy sheet mounted on said carriage and transporting rollers mounted on said carriage for transporting said band-shaped copy sheet so as to unwind the same from said supply reel and to move the same at a speed in said scanning direction equal to the speed of said carriage; an optical system mounted on said carriage for scanning during movement of said carriage in said scanning direction successive strip portions of said original extending in a direction transverse to said scanning direction and for projecting strip-shaped images of scanned strip portions onto corresponding successive strip portion of said copy sheet while the same is moved by said transporting rollers past said optical system, said optical system including a row of lens means extending in said transverse direction, each lens means having at least two cooperating refractive surfaces having a first radius of curvature in said scanning direction and a second radius of curvature in said transverse direction, said first and second radii of curvature being selected so that the image of a part of said scanned strip-shaped portion projected by each lens means is reversed in said scanning direction and not reversed in said transverse direction whereby a continuous nonreversed complete image of said original is produced on said copy sheet.

12. Apparatus as claimed in claim 11 including reversing roller means mounted on said carriage for reversing the direction of movement of said band-shaped copy sheet after the same has passed said optical system so that the reversed copy sheet does not move relative to said moving carriage.

13. Apparatus as claimed in claim 12 wherein said second supporting means include a conveyor for supporting the reversed copy sheet and moving opposite to the direction of carriage movement while the reversed copy sheet moves with said carriage to said end position; and comprising cutting means mounted on said carriage, and means for actuating said cutting means in said end position to cut said band-shaped copy sheet so that the cut off portion of said band-shaped copy sheet is transported by said conveyor opposite to the direction of the movement of said carriage; and means for developing the cut off portion of said copy sheet disposed for receiving the same from said conveyor.

14. Apparatus as claimed in claim 13 wherein said carriage has rollers; wherein said first supporting means include a casing having a transparent top wall for supporting the original, said casing having guide means for guiding said rollers of said carriage in said scanning direction, and supporting said conveyor and said developing means.

15. Apparatus as claimed in claim 14 comprising a drive motor, first transmission means connecting said drive motor with said carriage for moving the same, and second transmission means including an overrunning clutch connecting one of the rollers of said carriage with said transporting rollers.

16. Apparatus as claimed in claim 15 wherein said first transmission means include a winding drum; wherein said drive means include a manually operable coupling connecting said drive motor with said winding drum; and comprising return spring means for urging said carriage to move to said position of rest out of which said carriage is moved by said drive means and winding drum to said end position.

17. Apparatus as claimed in claim 13 wherein said reversing roller means include first and second reversing rollers, said copy sheet being guided between the same and then wound about said second reversing roller an angle of 180° degrees, said second reversing roller cooperating with said conveyor so that the reversed copy sheet is guided between the same and said conveyor, and including means for supporting said reversing rollers for vertical movement on said carriage so that said first reversing roller rests on said second reversing roller and the latter rests on said conveyor.

18. Apparatus as claimed in claim 13 wherein said means for actuating said cutting means includes a member mounted on said carriage for pivotal movement and supporting said cutting means, and an abutment on said casing engaging said member in said end position and displacing the same to operate said cutting means, said member having an arcuate guide portion located opposite said second reversing roller for guiding said copy sheet on said second reversing roller into contact with said conveyor.